(12) United States Patent
Sugar et al.

(10) Patent No.: US 6,882,851 B2
(45) Date of Patent: Apr. 19, 2005

(54) AD-HOC CONTROL PROTOCOL GOVERNING USE OF AN UNLICENSED OR SHARED RADIO FREQUENCY BAND

(75) Inventors: Gary L. Sugar, Rockville, MD (US); Neil R. Diener, Rockville, MD (US)

(73) Assignee: Cognio, Inc., Gaithersburg, MD (US)

( * ) Notice: Subject to any disclaimer, the term of this patent is extended or adjusted under 35 U.S.C. 154(b) by 50 days.

(21) Appl. No.: 10/249,180

(22) Filed: Mar. 20, 2003

(65) Prior Publication Data

US 2003/0181213 A1 Sep. 25, 2003

Related U.S. Application Data

(60) Provisional application No. 60/365,776, filed on Mar. 21, 2002.

(51) Int. Cl.[7] ............................. H04Q 7/20; H04B 7/00
(52) U.S. Cl. ........................ 455/454; 455/507; 455/113
(58) Field of Search ................................. 455/454, 500, 455/71, 75, 105, 113, 151.1, 161.1, 164.1, 182.2, 182.1, 522, 69, 450, 507, 41.2; 370/282, 252, 466, 442

(56) References Cited

U.S. PATENT DOCUMENTS

| | | | | |
|---|---|---|---|---|
| 5,412,658 A | * | 5/1995 | Arnold et al. | 370/330 |
| 5,475,677 A | * | 12/1995 | Arnold et al. | 370/280 |
| 5,907,812 A | * | 5/1999 | Van De Berg | 455/461 |
| 6,028,853 A | * | 2/2000 | Haartsen | 370/338 |
| 6,377,608 B1 | | 4/2002 | Zyren | 375/132 |
| 6,577,670 B1 | * | 6/2003 | Roberts | 375/133 |
| 2002/0123307 A1 | * | 9/2002 | Winarski | 455/41 |
| 2002/0126692 A1 | * | 9/2002 | Haartsen | 370/450 |
| 2002/0142779 A1 | * | 10/2002 | Goto et al. | 455/450 |
| 2002/0173272 A1 | * | 11/2002 | Liang et al. | 455/63 |

FOREIGN PATENT DOCUMENTS

| | | | |
|---|---|---|---|
| WO | WO 03/028313 A2 | 4/2003 | ........... H04L/12/56 |

OTHER PUBLICATIONS

Jon M. Peha, "Wireless Communications and Coexistence for Smart Environments," IEEE Personal Communications, Oct., 2000, pp. 6–8.

Satapathy et al., "A Novel Co–existence Algorithm for Unlicensed Variable Power Devices," IEEE International Conference on Communications, Jun., 2001.

(Continued)

*Primary Examiner*—David Hudspeth
*Assistant Examiner*—S. Smith
(74) *Attorney, Agent, or Firm*—D. Andrew Floam

(57) ABSTRACT

Systems and methods to enable different types of radio communication devices to communicate using a common language in order to enable the devices to regulate their use of the spectrum. Each device participating in the ad hoc control channel (ACC) protocol transmits information using a common signal format that each of the other participant devices is capable of recognizing, in order to share information about how it uses the radio frequency band. Each device receives the information transmitted by other participant devices and based on that information, controls one or more of its operational parameters that impact usage of the radio frequency band. The ACC protocol enables devices of the same or different type to harmonize (instead of alienate) themselves with each other by allowing them to communicate about their usage of the radio frequency band using a common signaling framework. Improvement can be achieved in spectrum efficiency and ultimately provide a more reliable and enjoyable experience for the end user of a device that operates in that radio frequency band.

45 Claims, 9 Drawing Sheets

OTHER PUBLICATIONS

Charles L. Jackson, "Distributed Channel Assignment: The Tragedy of the Commons, Oblers's Paradox, and Mad Cow Disease," BWE ECE Colloquium, Mar. 30, 2001, slides 1–56.

Werbach, "Open Spectrum: The Paradise of the Commons," Edventure, Esther Dyson's Monthly Report, vol. 19, No. 10, Nov. 20, 2001, pp. 1–30.

Satapathy et al., "Spectrum Sharing Without Licenses: Opportunities and Dangers," Proceedings of the Telecommunications Policy Research Conference (TPRC), 1996, pp. 1–19.

Yang et al., "On the Use of Unlicensed Frequency Spectrum, Use Rule Evolution, and Interference Mitigation," Adaptive Broadband, Jan. 18, 2001, pp 1–12.

Mitola, III, "Cognitive Radio: An Integrated Agent Architecture for Software Defined Radio," Dissertation, Doctor of Technology, Joseph Mitola, III, Royal Institute of Technology, Sweden, May 8, 2000, pp. 1–294.

McFarland et al., "5–GHz Unified Protocol (5–UP) Proposal, OFDM Extensions for 802.11a," Doc. IEEE 802.11–00/175, Jul. 2000.

Petterson, "A Comparison of Radio Resource Management Strategies in Bunched Systems For Indoor Communication," IEEE Vehicular Technology Conference, May 1999.

Qui et al., "Network–Assisted Resource Management for Wireless Data Networks," IEEE Journal on Selected Areas in Communications, vol. 19, No. 7, Jul., 2001.

Garces et al., "An Access Etiquette for Very–Wide Wireless Bands," Proceedings of the 7th International Conference on Computer Communications and Networks (IC3N'98), Oct., 1998.

Kontson, "In Pursuit of a Wireless Device Bill of Rights," Spectrum Management Working Group, FCC–TAC, Sep. 18, 2002.

Luo et al., "A Self–Coordinating Approach to Distributed Fair Queueing in Ad Hoc Wireless Networks," INFOCOM, 2001.

* cited by examiner

ACC BEACON

Frequency(ies) of Operation
Power Level
Traffic/Protocol Type
Hopping Pattern (if applicable)
Bandwidth
Data Rate
Device Identifier

US 6,882,851 B2

AD-HOC CONTROL PROTOCOL GOVERNING USE OF AN UNLICENSED OR SHARED RADIO FREQUENCY BAND

CROSS REFERENCE TO RELATED APPLICATIONS

This application claims priority to U.S. Provisional Application No. 60/365,776, filed Mar. 21, 2002, the entirety of which is incorporated herein by reference.

BACKGROUND OF INVENTION

Unlicensed radio spectrum, often called the unlicensed band, has been allocated in various countries to allow devices or services to use spectrum without exclusion to other devices or services. For example, in the United States, the unlicensed bands at 2.4 GHz and 5 GHz do not require a license fee, and are available to be used by any device or service, within certain power and bandwidth limits. Similar conditions hold true for unlicensed bands in other countries. However, with freedom and zero cost spectrum comes overuse.

Market projections indicate that use of the unlicensed bands will grow significantly. As more devices use the unlicensed bands, the spectrum will become more crowded, which in turn will degrade the quality of service. Already, in the U.S., many experts have complained that the unlicensed bands have become a "garbage dump" due both to a lack of standardization and "greedy" use of spectrum by some devices, such as the 900 MHz band where many cordless phones were designed to operate. Thus, technology is needed to exploit the benefits of the unlicensed band without degrading the level of service that users expect.

SUMMARY OF INVENTION

Briefly, systems and methods are provided to enable different types of radio communication devices to communicate using a common language called an ad-hoc control channel (ACC) protocol. Devices that participate in the ACC protocol self-regulate their use of the frequency band. In general, no single device or group of devices is responsible for managing the use of the radio frequency band by other devices. Each device participating in the ad hoc control channel (ACC) protocol transmits (e.g., broadcasts) information using a common signal format that each of the other participant devices is capable of recognizing, in order to share information about how it uses the radio frequency band. Each device receives the information transmitted by other participant devices and based on that information, controls one or more of its operational parameters that impact usage of the radio frequency band. The ACC protocol enables devices of the same or different types to harmonize (instead of alienate) themselves with each other by allowing them to communicate about their usage of the radio frequency band using a common signaling framework. Improvement can be achieved in spectrum efficiency and ultimately provide a more reliable and enjoyable experience for the end user of a device that operates in that radio frequency band.

The above and other objects and advantages will become more readily apparent when reference is made to the following description take in conjunction with the accompanying drawings.

DETAILED DESCRIPTION

In an unlicensed or shared frequency band, it is inevitable that two or more of devices will be transmitting at the same time. There is, therefore, a high likelihood that they will interfere with each other. When interference occurs, a signal from one device to another may not be received properly, causing the source device to retransmit (therefore reducing throughput), or possibly entirely destroying the communication link between two communication devices.

Managing an unlicensed band may involve minimizing interference and maximizing spectrum efficiency. Minimizing interference is expressed in terms of signal-to-noise ratio (SNR), bit error rate (BER), etc. Maximizing spectrum efficiency is expressed as data rate per bandwidth used per area (bps/Hz/m$^2$) or as a number of "satisfied" users, where satisfied is based on meeting certain performance criteria such as: data rate, latency, jitter, dropped sessions, and blocked sessions. A control protocol is useful to avoid interference when possible and to mitigate the impact of interference when it cannot be avoided.

Figure 1:
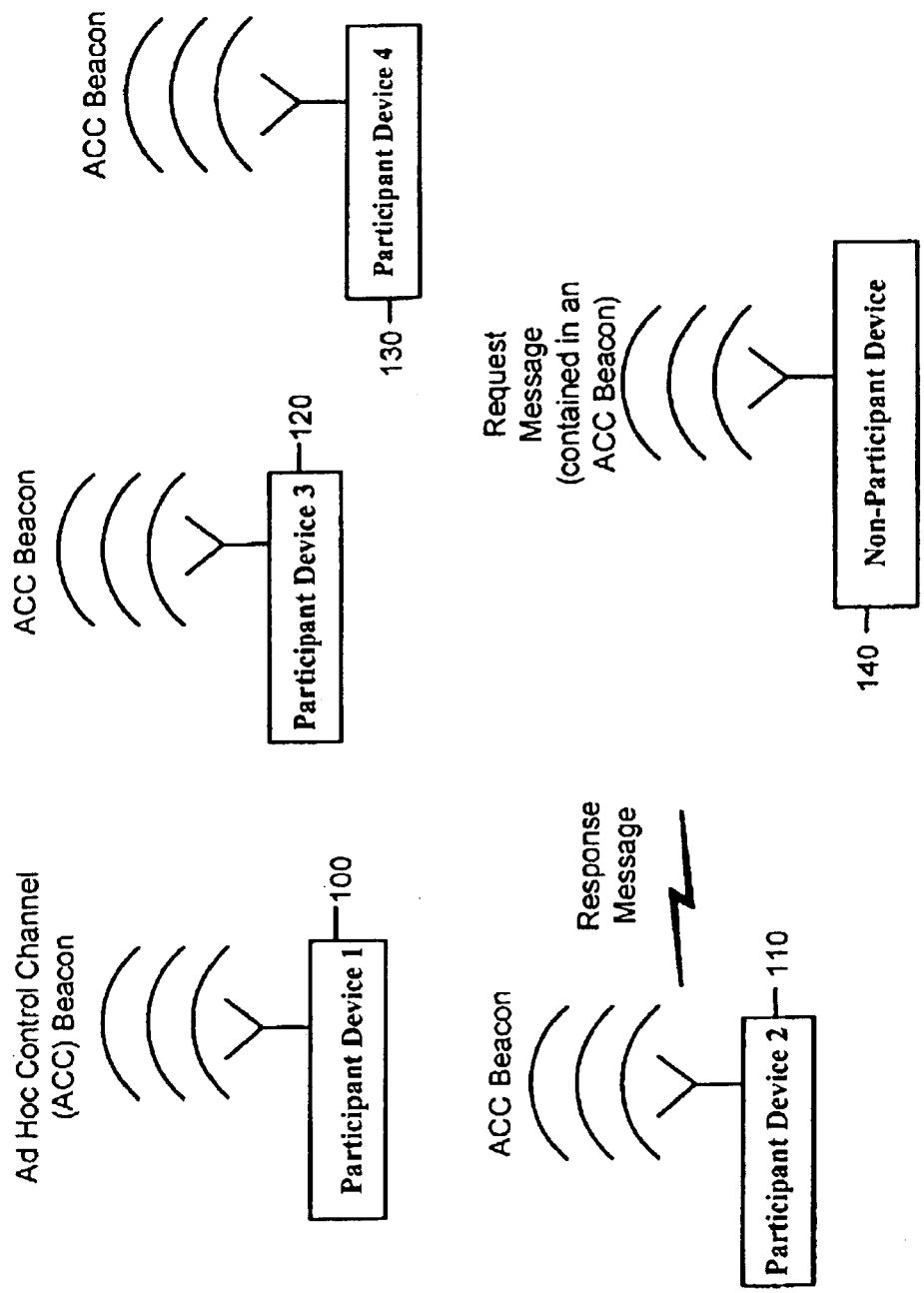
FIG. 1 is a block diagram showing multiple wireless radio communication devices that operate in a shared radio frequency band and employ the ad hoc control (ACC) protocol.
Figure 2:
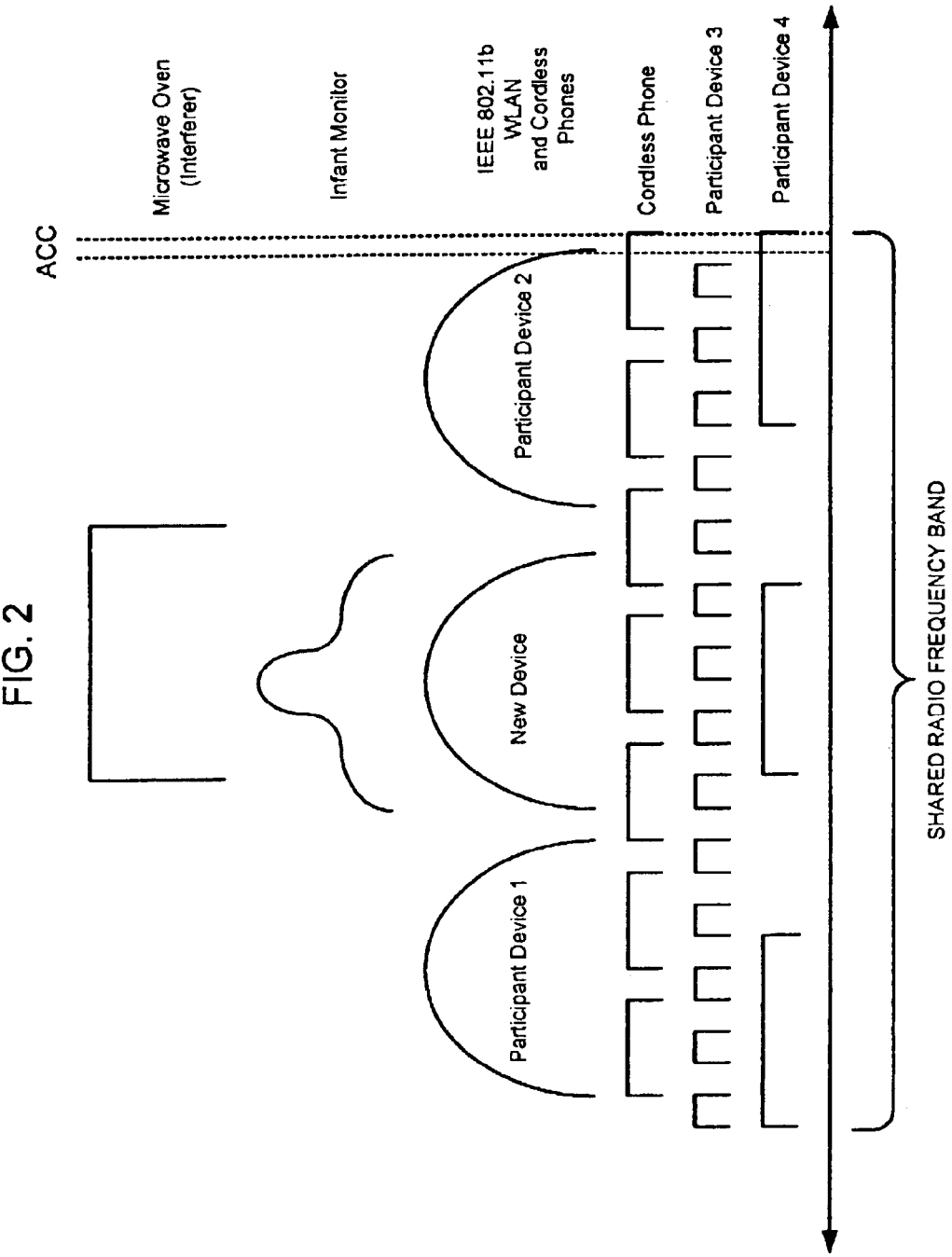
FIG. 2 is a graphical diagram showing a spectral profile of an exemplary radio frequency band where the multiple radio communications shown in FIG. 1 may operate.

Referring first to FIGS. 1 and 2, a plurality of wireless radio communication devices are shown that operate in a shared or unlicensed frequency band. Devices 100, 110, 120 and 130 are called "participant" devices because they are already operating in accordance with rules of an ad-hoc control channel (ACC) protocol. Device 140 is called a "non-participant" device because it may seek to access use of the frequency band, but is currently not participating in the ACC protocol. All of the devices 100–140 are operating in a shared radio frequency band, an example of which is the 2.4 GHz unlicensed band (in the U.S.) shown in FIG. 2. For example, device 100 is an IEEE 802.11b device, device 110 is another IEEE 802.11b device, device 120 is a frequency hopper device of one type and device 130 is a frequency hopper device of another type. Another exemplary band is the 5 GHz UNII bands in the U.S. The new or non-participant device 140 may be, for example, another IEEE 802.11b device. FIG. 2 shows that devices 100 and 110 and new device 140 operate on different 802.11b channels, but it should be understood that they all may operate on the same 802.11b channel.

The participant devices may communicate using an ACC. The ACC may be at a particular frequency channel in the radio frequency band. For example, FIG. 2 shows that the ACC may be a narrowband channel located at a far end of the radio frequency band. Alternatively, the ACC may be created with a spreading code within a particular frequency sub-band (channel) in the radio frequency band, similar to direct sequence spread spectrum techniques used in IEEE 802.11b. In fact, the ACC may be a particular IEEE 802.11b channel.

Figure 3:
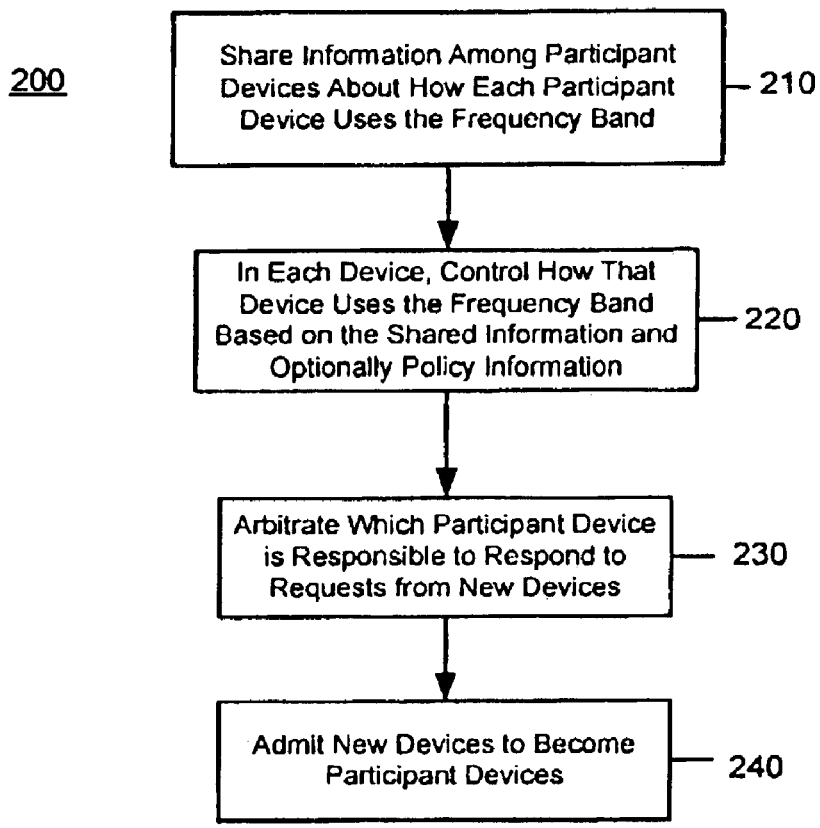
FIG. 3 is a flow chart that generally illustrates the operation of the ACC protocol.

Referring to FIG. 3, a general process 200 for the ACC protocol will be described. In step 210, using the ACC (e.g., frequency channel, spreading code, etc.) recognized by each participant device and a common signal format also recognized and used by each participant device, the participant devices share information with each other as to how each participant device is using the frequency band. Examples of this information are described hereinafter. In step 220, on the basis of this shared information and optionally also on the basis of spectrum policy information, each participant device controls how it uses the frequency band. In some cases and under certain conditions, a participant device may change its operational parameters as and if needed, and in other cases and under certain conditions, no changes may be necessary. When transmitting information to other participant devices, a participant device may include, in addition to its spectrum usage information, information about other activity the device detects in the band, such as at which frequencies the device detects interference from other non-participant devices.

In the course of sharing information among the participant devices, as shown by step 230, a provision may be made to arbitrate which participant device has the responsibility for responding to requests from new devices. New devices may be admitted to become participant devices in step 240, and may be assigned operational parameters to use, or may independently select which operational parameters to use based on policy information stored therein. A more complete description concerning the admission of new devices is described hereinafter in conjunction with FIGS. 7 and 8.

Each device that is capable of participating in the ACC protocol may store spectrum policy information about how it should behave with respect to other devices.

This policy information may be obtained or derived from a regulatory body that regulates the applicable radio frequency band or bands. For example, in the United States, the Federal Communication Commission (FCC) regulates emission (power level, bandwidths, etiquette, etc.) and other requirements that are permitted in frequency bands, including the unlicensed bands. These requirements can be used to formulate the policy information stored in a device. In addition, or alternatively, device manufacturers may agree to a basic set of policies concerning device behaviors in a frequency band, and to store information pertaining to those policies in devices that they make and sell. It is further possible to update or change policy information stored in a device already in the field in order to account for changes made by the regulatory body or association of manufacturers.

The policy information is useful because when a participant device receives information from other participant devices as to their usage of the frequency band, that participant device is able to make its own decision about how to behave in the frequency band, such as at what frequency to locate in the band. It may be a general spectrum policy that a participant device should attempt to avoid all other participant devices if possible. If a participant device cannot avoid all other participant devices, it can request a participant device to move or change how it uses the frequency band. When a participant device receives a request to move or change its behavior, it should honor the request if possible. In a highly-used space, the ACC protocol may enforce a limit on how often a device can change parameters.

If access can still not be obtained by a participant device, several options may be available:

1. Notify the user of the participant device to deal with the situation.
2. Set usage prioritization among devices and allocate usage according to priority.
3. Attempt to make a determination as to which participant device the interference is least likely to affect based on parameters such as signal strength.

One example of a usage prioritization is based on traffic type. Devices that communicate a certain type of traffic, such as video, may have a higher priority entitlement to the frequency band, over devices that communicate another type of traffic, such as voice or audio. Usage prioritization could also be based on communication protocol. Whatever the basis for prioritization, if a conflict regarding access to or use of the band arises between any two devices, the higher priority device will prevail. If there is a conflict between devices having the same priority, one solution would be to give one device priority for a certain period of time, then switch priority to the other device. Another solution is to allocate usage based on a first-come, first-serve basis. This usage prioritization information would be stored as policy information in each device, and may be updated from time-to-time across all participant devices.

Figure 4:
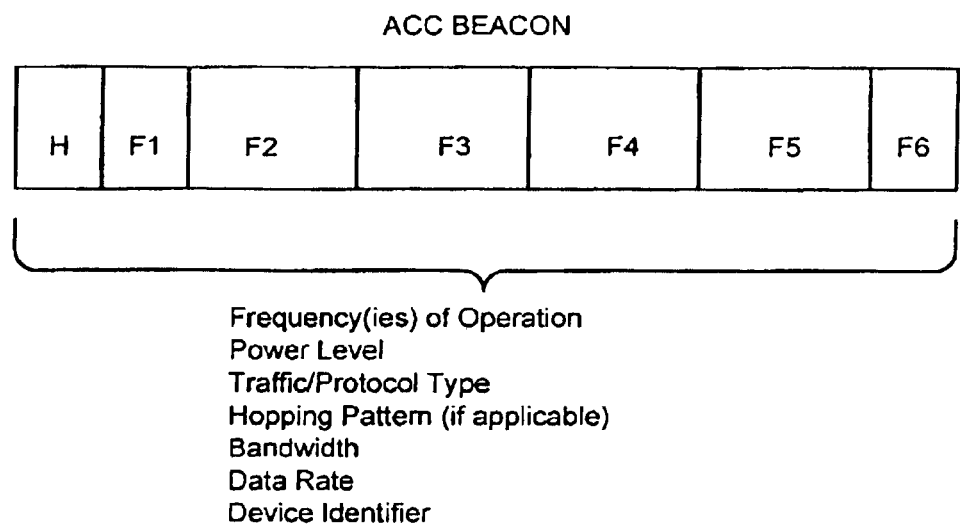
FIG. 4 is diagram of an exemplary beacon signal that ACC participant devices transmit to each other in order to share information about their respective use of the frequency band.
Figure 5:
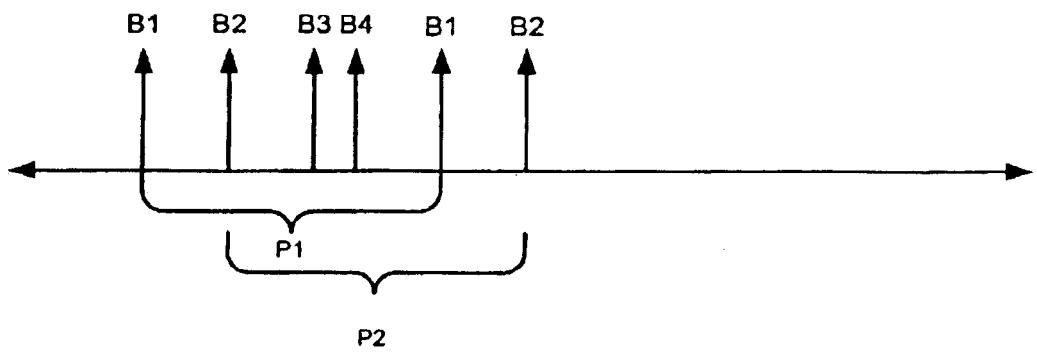
FIGS. 5 and 6 are timing diagrams that depict specific procedures whereby ACC participant devices transmit beacon signals.
Figure 6:
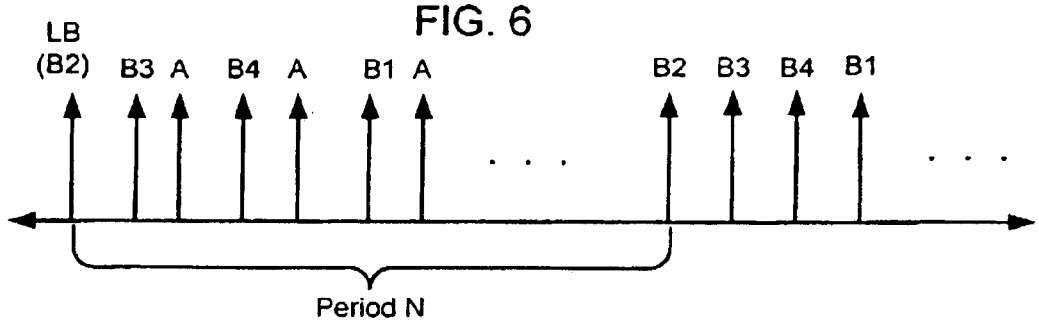

One manner in which participant devices may share information with each other is through the use of beacon signals. FIG. 1 shows that each participant device transmits a beacon signal. FIGS. 4–6 show an exemplary beacon signal and one mechanism for sharing information about participant devices.

Referring to FIG. 4, an exemplary ACC beacon signal will be described. A participant device broadcasts an ACC beacon signal every N seconds, for example, in a common format, such as that shown in FIG. 4. The ACC beacon signal is intended to be received by any device that is capable of receiving and decoding ACC beacon signals. The beacon signal may include a header (H) and several fields (F1 through F6, for example) that include information such as: the frequency (or frequencies) the device is using, the power level it transmits at, the traffic type it is generating (e.g., voice, data, video, audio, etc.), the communication protocol type it uses to communicate the traffic to other devices (e.g., IEEE 802.11b, Bluetooth™, etc.), the frequency hopping pattern it uses (if applicable), the frequency bandwidth it occupies, its data rate and a device type (e.g., set-top box, hand-held unit, etc.). If the device is a frequency hopping device, it may include in its beacon signal the hop duration, hop bandwidth, hop timing as well as the frequency hopping sequence. The beacon signal may also include a field that requests another participant device to change its frequency, power level, etc. Further still, the ACC beacon signal may include a request message from a device seeking to become a participant device as described hereinafter in conjunction with FIG. 8.

Each participant device can transmit its beacon signal periodically as shown in FIG. 5, or otherwise on an occasional or aperiodic basis. Other participant devices will detect and decode the beacon signals and gain knowledge about how that device uses the spectrum. For example, participant device 100 transmits its beacon signal B1 periodically with period P1, participant device 110 transmits its beacon signal B2 with period P2, etc. This may be suitable for some applications.

To facilitate low power operation for participant devices, it may be desirable that a participant device wake up and hear all the relevant beacon signals during one power-up interval. One way to achieve this is shown in FIG. 6. A beacon interval may begin with a "lead beacon" (LB) followed by the other beacons. For example, when a participant device powers-up from a sleep or low power mode, it may listen for a beacon interval to detect a lead beacon. If it does not detect a lead beacon, it becomes a "beacon leader" and transmits a lead beacon every N seconds. For example, in FIG. 6, participant device 110 is a beacon leader and transmits its beacon B2 as the lead beacon. On the other hand, if a participant device comes up and detects a beacon, it joins at the end of the train of beacons that follow the lead beacon. An arbitration scheme such as carrier-sense multiple-access (CSMA) is used to arbitrate access to the end of the beacon train. Since collisions can occur, the beacon leader generates acknowledgment (A) packets to accept the new trailing beacon signals. Each participant device remembers its position in the beacon train by counting all of the beacons and/or acknowledgments that preceded it, so arbitration only occurs once. It is possible that a participant device may hear multiple beacon trains, for example, if it is near two groups of participant devices. In this case, that particular participant device will join both groups.

A participant device may choose to terminate its participation. In the orderly case, a participant device may include in a beacon signal information to indicate to the other participant devices that it is terminating. In some cases, a participant device will terminate without notice. The participant that is next in the beacon train transmits its beacon signal after a timeout interval, and updates its place in the beacon train. If the beacon leader terminates, the next participant in line takes over its place as leader.

In an IEEE 802.11 WLAN, it may be redundant for every station (STA) to declare itself as a participant to the ACC protocol. To reduce overhead, the access point (AP) could participate on behalf of the entire WLAN. One drawback of this is that the interference profile or other spectrum activity of STAs at the edge of the WLAN might be different than at the AP.

The ACC beacon signals are designed to be heard even with a low signal level. If a first device would tend to cause interference problems with a second device, the second device should hear the ACC beacon sent by the first device. There may be some cases when a first device can detect the beacon of a second device, but the second device is not strong enough to cause interference. In this respect, honoring all beacon signals from another device may be taken as the conservative approach.

There are some enhancements to the basic beacon mechanism described above. One enhancement involves transmitting in a beacon signal information to indicate the transmit power level of the normal signal that a participant device transmits with, and the transmit power of the beacon signal itself. When another device receives that beacon signal, it can examine the actual received power level of the beacon and compare it with the information included in the beacon signal in order to estimate the loss of the channel between the two devices. That receiving device can also calculate how strong the normal signals from the participant device will be, and determine if it wants to honor it or not.

Another enhancement is one in which in its beacon signal, a first participant device requests a sample transmission from a second participant device to occur at a designated time. The first participant device measures the sample signal to see if it actually causes an interference problem with it. The first participant device can then decide whether the second device should be considered as an interferer and therefore honor its spectrum usage information.

It is desirable to make the components to implement the ACC protocol in each device as simple as possible regardless of the type of device in which it is employed.

By simplifying its implementation, deployment can be made cost effective in a wide range of devices. The baseband modulation format and the radio frequency transmission method may be chosen so that they can be implemented with existing radio hardware and with existing or minimal additional firmware and/or software in devices already planned for deployment in a particular application. However, solutions are also described hereinafter to provide the ACC protocol technology in a "retrofitting" manner to devices, as an add-on module.

Figure 7:
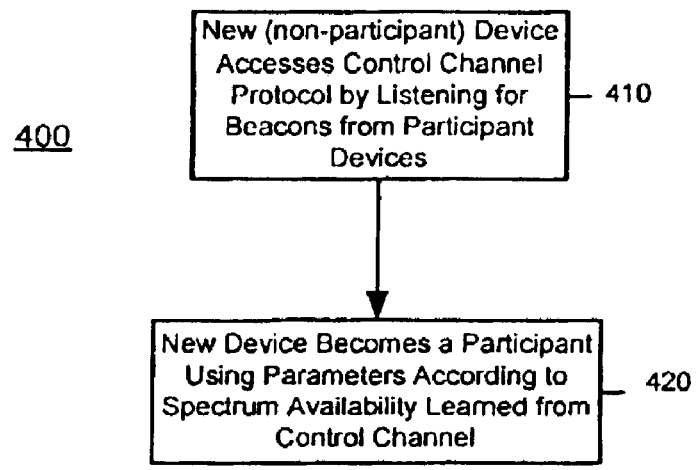
FIGS. 7 and 8 are flow charts depicting procedures by which a new (nonparticipant) device joins the ACC protocol.
Figure 8:
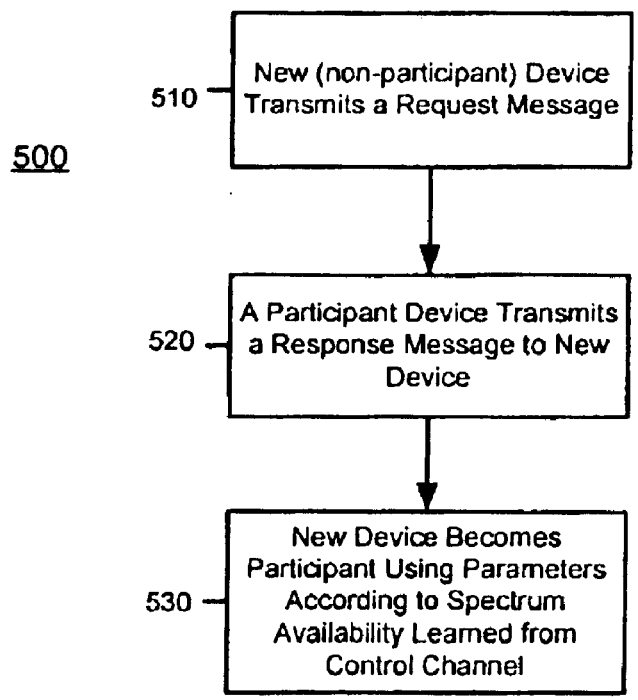

FIGS. 7 and 8 are flow charts that depict two ways that a non-participant device may join the ACC protocol and become a participant device. FIG. 7 shows a process 400 in which a new (non-participant) device accesses the ACC protocol by first, in step 410, listening for beacon signals from participant devices, and then in step 420, learning where and/or at what time intervals spectrum is available and begins operation in the spectrum using parameters based on information gathered from the beacon signals. That device will transmit a beacon signal to share information with the other participant devices about its spectrum usage characteristics.

In FIG. 8, a process 500 is shown in which the ACC protocol supports, in addition to the beacon signal, a request signal and a response signal (shown also in FIG. 1 between device 110 and device 140). In step 510, a new (non-participant) device broadcasts a request message on the ACC intended for reception by any participant device. The request message is sent using modulation parameters common to the ACC protocol. For example, the request message may be an ACC beacon signal having a field containing data for requesting access to the spectrum, as shown in FIG. 1. In step 520, a participant device (that has been assigned responsibility for handling request messages for a current time interval) receives the request message and transmits a response message to the requesting device. As an example, the participant device that is the beacon leader may respond to the request message. The response message may contain any one or more of the following information:

Number of Participant Devices;

Number and kind of each communication protocol active in the frequency band (e.g., IEEE 802.11g, Bluetooth™, cordless1, IEEE 802.11a, IEEE 802.11b, etc.);

Priority information for QoS (e.g., cordless needs 2.42–2.43 MHz for voice, rest is for data);

"Bad" frequencies known to contain interference;

Measured duty cycles at various frequencies;

High-level services supported and on which protocol (e.g., remote control protocol using 802.15.4 on channel 5); and Security information and permissions.

In addition, if the request message contains a request for access to the frequency band, the response message may include a channel assignment as well as other restrictions on the device to account for the other participant devices already active in the frequency band. The channel assignment may be made using the following information from each participating device, as well as the new participant: (1) spectrum map of received signal strength indicator (RSSI) and duty cycle vs. frequency; (2) transmit power; (3) transmit bandwidth, and (4) current consumption requirements. When a device terminates its participation in the ACC protocol or joins the ACC protocol, one or multiple devices may change their channel allocations in order to optimize the use of the spectrum.

There may be a policy for deciding how often a participant device is required to respond to request messages based on its sensitivity to power consumption. In some cases it may make sense to assign ownership to one participant device (e.g., set-top box, AP, or a special gateway device) in order to minimize power consumption for other battery-powered participant devices. However, the ACC protocol generally operates as a distributed protocol. Since the policy decisions are jointly owned by all participants, there need not be a notion of a network "master."

Figure 9:
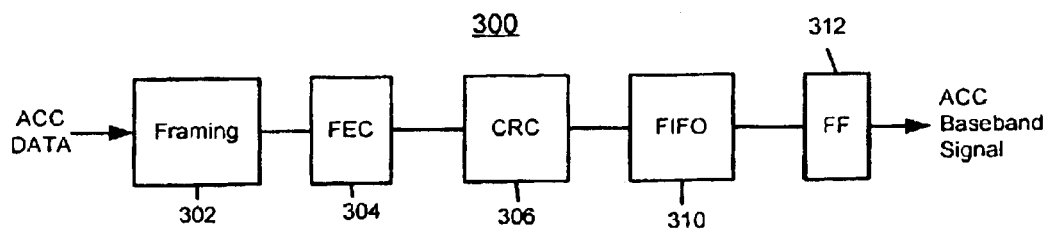
FIG. 9 is a block diagram of an exemplary baseband modulation process suitable for the ACC protocol.

FIG. 9 shows an example of an ACC baseband modulation process 300 (forming a part of an ACC modem). A framing block 302 frames raw ACC data bits (supplied by a processor) in accordance with predefined word and field size parameters (for, e.g., beacon signals, request signals, response signals, etc.). A forward error correcting (FEC) block 304 follows the framing block to add FEC to the framed data. A cyclic redundancy code (CRC) block 306 follows the FEC block 304 to add redundancy codes. A first-in first-out (FIFO) buffer 310 receives the output of the CRC block 306 which supplies buffered data to a latch 312 driven by a clock signal. Data is clocked out from the latch 312. All of the blocks for the baseband modulation process 300 may be implemented in software or firmware (gates), or blocks 302, 304 and 306 may be implemented in software and blocks 310 and 312 may be implemented in firmware. The output of the ACC baseband modulation process 300 is an ACC baseband signal to be transmitted. A complementary ACC baseband demodulation process is shown at reference numeral 352 in FIGS. 11A and 11B.

Figure 10A:
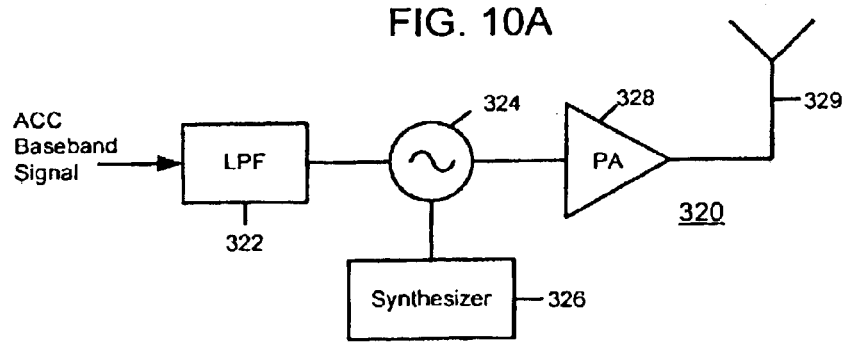
FIGS. 10A and 10B are block diagrams of exemplary radio transmitters suitable for transmitting ACC protocol signals.
Figure 10B:
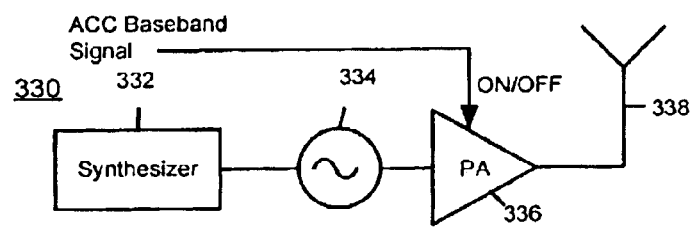

FIGS. 10A and 10B show examples of radio transmitters that may be useful to upconvert the output of the baseband modulation process 300 to RF. FIG. 10A shows an example of a frequency shift keying (FSK) transmitter 320. The output of the baseband modulation process 300 is converted to an analog signal by an analog-to-digital converter {not shown) and the analog signal is coupled as input to a low pass filter (LPF) 322. The output of the LPF 322 is coupled to an oscillator 324 that is driven to oscillate at a radio frequency (e.g., the radio frequency associated with the control channel in the far upper end of the radio frequency band) controlled by a synthesizer 326. Omitted for the sake of simplicity is a digital-to-analog converter to convert the digital ACC baseband signal to an analog signal prior to the LPF 322.

Another example shown in FIG. 10B is an ON/OFF keying (OOK) transmitter 330. In this transmitter, a synthesizer 332 drives an oscillator 334 to oscillate at a carrier frequency. The output of the oscillator 334 is coupled to a power amplifier (PA) 336 that amplifies the signal for transmission via an antenna 338. The output of the baseband modulation process 300 is used to key ON and OFF the power amplifier 336, where ON may designate a "1" and OFF may designate a "0." In this manner, the digital information output by the modulation process is modulated onto the oscillator signal at a frequency controlled by the synthesizer 332.

An advantage of the transmitters shown in FIGS. 10A and 10B is that they use many components already in most radio transceivers, such as the synthesizer, oscillator and power amplifier.

Figure 11A:
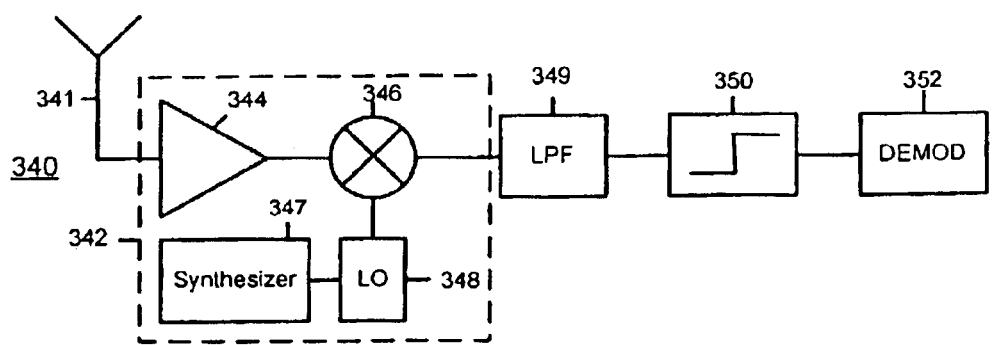
FIGS. 11A and 11B are block diagrams of receiver systems suitable for receiving ACC protocol signals.
Figure 11B:
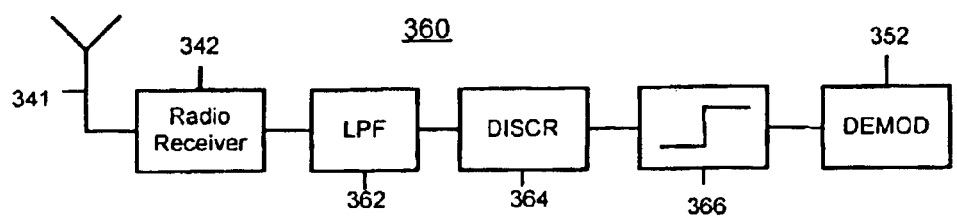

FIGS. 11A and 11B illustrate examples of receiver systems (for RF downconversion and baseband demodulation) that can be used to receive OOK and FSK signals, respectively, and recover the ACC data. FIG. 11A shows a receiver system 340 comprising a radio receiver 342 coupled to an antenna 341 and consisting of a low noise amplifier (LNA) 344, an RF downmixer 346, an oscillator 347, a synthesizer 348 and an LPF 349. The output of the LPF 349 is an analog signal that is coupled to a detector 350 which resolves the two states of the OOK modulated signal. The demod block 352 performs the baseband demodulation to undue the modulation and framing processes shown in FIG. 9. The output of the demod block 352 is the raw ACC data that can be processed by a processor.

In FIG. 11B, the receiver system 360 comprises the radio receiver 340 coupled to antenna 361, an LPF 362, a discriminator 364 and a detector 366. The discriminator 364 and detector 366 process the output of the LPF 362 to recover the FSK data. A demod block 352 recovers the raw ACC data from the signal at the output of the detector 366. The receiver hardware and decision firmware for the OOK and FSK receivers are simple to implement, and in many cases use existing radio hardware in the device. An ACC modem may be formed by the ACC baseband modulation blocks shown FIG. 9 together with the post-RF processing elements and the demod block 352 shown in FIGS. 11A or FIG. 11B.

Figure 12:
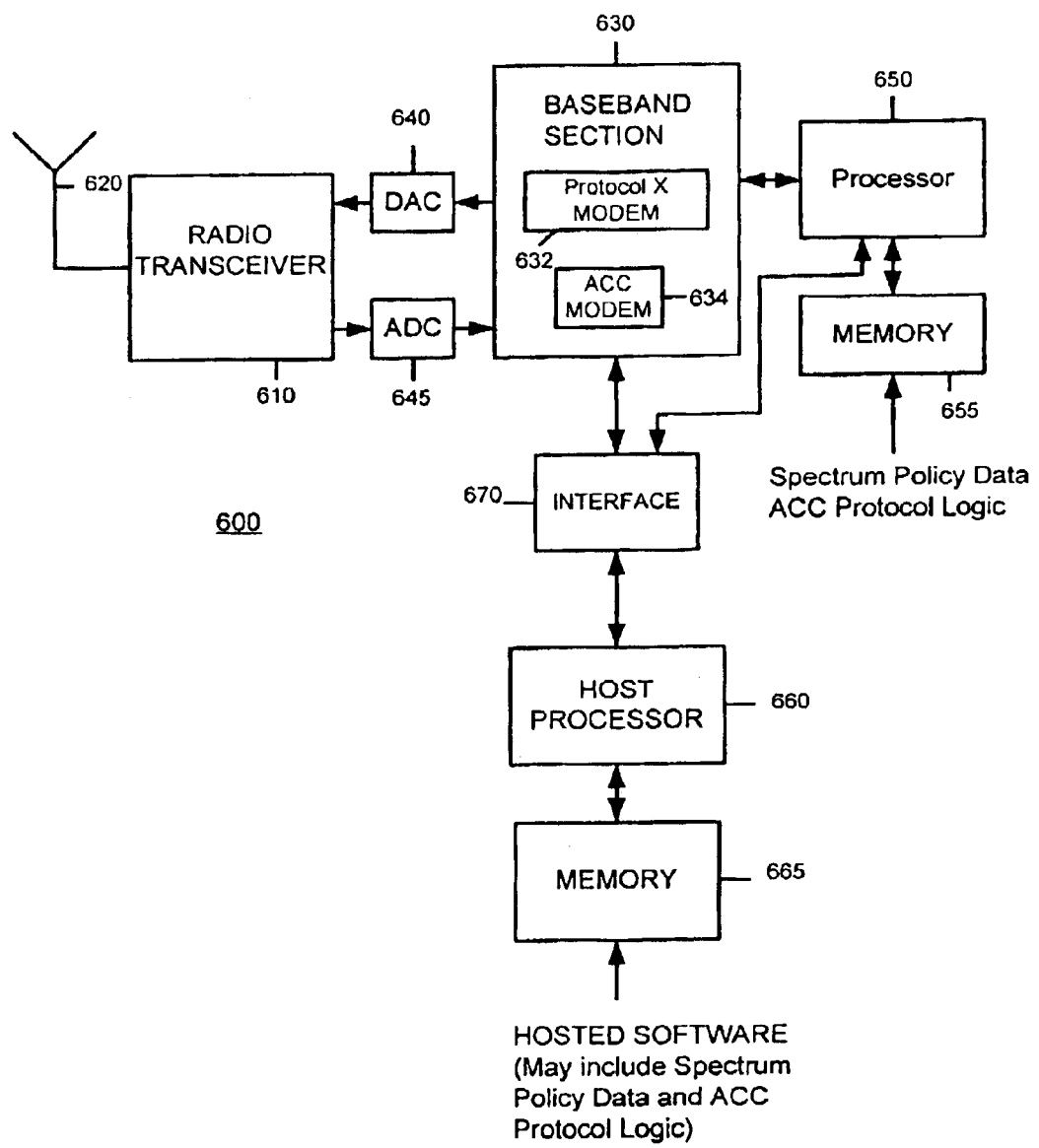
FIG. 12 is a block diagram of an exemplary radio communication device that may participate in the ACC protocol.

Turning to FIG. 12, an exemplary radio communication device 600 is shown and depicts one way in which the ACC protocol technology may be deployed in a device to enable it to become a participant device. The device 600 comprises a radio transceiver 610 that transmits and receives signals via at least one antenna 620. The characteristics of the radio transceiver 610 may vary among specific participant devices, but it nevertheless will support the ability to transmit and receive ACC protocol signals in the radio frequency band of interest. The radio transceiver 610 downconverts a receive signal to a baseband signal that is coupled to a baseband processing section 630 via an analog-to-digital converter (ADC) 640. Conversely, the radio transceiver 610 upconverts a baseband signal supplied by the baseband processing section 630 via a digital-to-analog converter (DAC) 645 for transmission via the antenna 620. The radio transceiver 610 would either already include the necessary components to perform the types of upconversion and downconversion described in conjunction with FIGS. 10A, 10B, 11A and 11B, or will include them as additional components.

The baseband section 630 includes a modem 632 that performs the baseband modulation and demodulation required to transmit and receive traffic data according the communication protocol that the device supports, such as, for example, the IEEE 802.11x protocols, the Bluetooth™ protocol, IEEE 802.15.4, etc. In addition the baseband section 630 includes an ACC modem 634 that performs the baseband modulation and demodulation to perform the signal formatting (and de-formatting) of spectrum usage data in accordance with the ACC protocol, examples of which are described above in conjunction with FIGS. 9, 11A and 11B. The baseband section 630 may be implemented in an application specific integrated circuit (ASIC) with a plurality of digital logic gates. Alternatively, many or all of the functions of the baseband section 630 may be performed by software executed by a processor, such as processor 650 or processor 660, described further hereinafter. The modems 632 and 634 may be integrated into one modem block.

Higher level logic may be performed by an on-board or embedded processor 650. Instructions executed by the processor 650 to perform the ACC protocol signal generation and device control processes described above may be stored in an on-board memory 655. For example, spectrum policy information and ACC protocol control logic may be stored in the memory 655. As an alternative or in addition to the embedded processor 650 and memory 655, a host processor 660 may be coupled to the baseband section 630 via an interface 670. The host processor 660 will likewise execute instructions stored in a memory 665 that may include the spectrum policy data and ACC protocol control logic. The host device may be a computer (laptop or desktop), PDA, set-top box, infant monitor, cordless phone, cellular phone, remote control, television, stereo equipment, or any other device that uses wireless communication in a shared radio frequency band.

Figure 13:
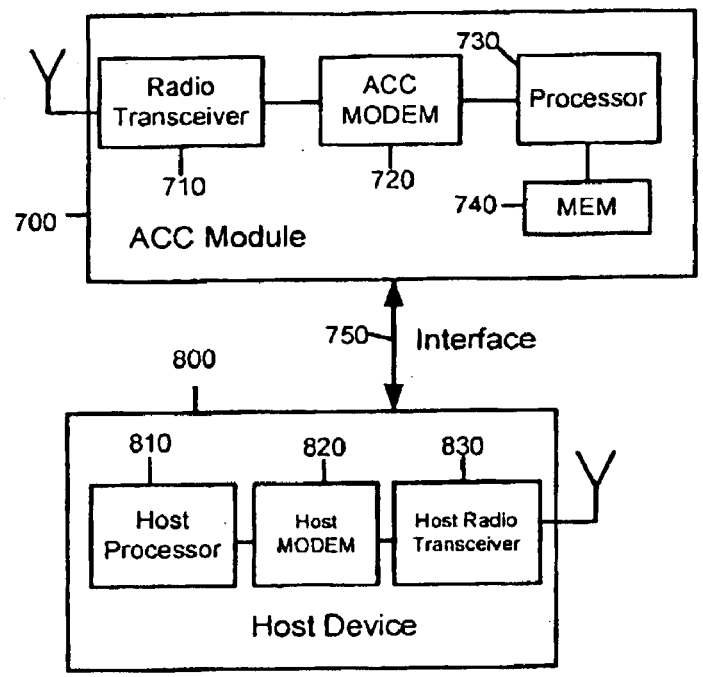
FIGS. 13 and 14 are block diagrams showing alternative ways of deploying the ACC protocol technology in radio communication devices.
Figure 14:
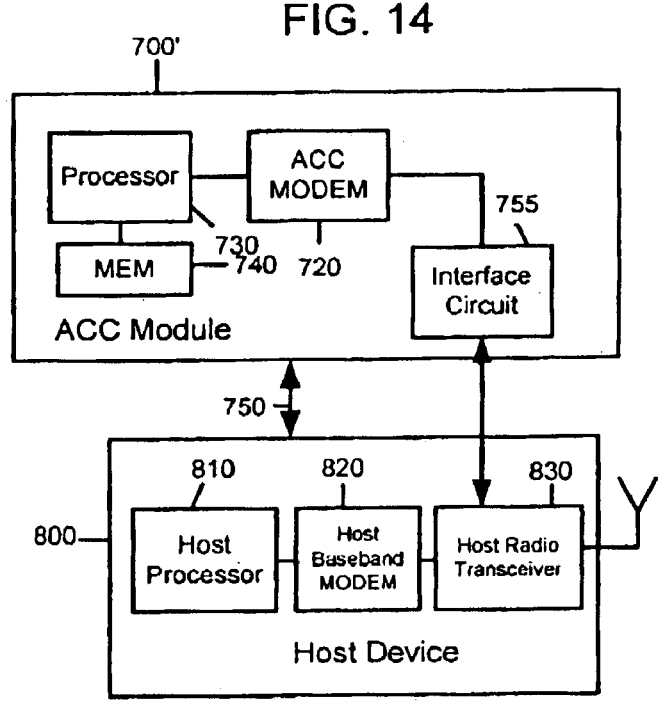

FIGS. 13 and 14 illustrate examples of other possible deployments of the ACC protocol technology. In FIG. 13, an ACC module 700 is provided that is a stand-alone module dedicated to supporting the ACC protocol technology in order to supplement the functionality of a host radio communication device that cannot otherwise be altered or enhanced to execute the ACC protocol technology. The ACC module 700 comprises a radio transceiver 710, an ACC modem 720 (e.g., an ASIC), a processor 730 and a memory 740. The components of the ACC module 700 are designed to be dedicated solely or primarily to implementing the ACC control protocol procedures. The radio transceiver 710 is a simple transceiver that performs the necessary upconversion/downconversion to transmit and receive ACC protocol signals, examples of which are shown in FIGS. 10A, 10B, 11A and 11B. The ACC modem 720 is similar to the ACC modem 634 shown in FIG. 12, and executes the baseband modulation and demodulation of the ACC protocol signals (e.g., beacon signals, request signals, response signals, etc.). The processor 730 performs the higher level processing and ACC control. The memory 740 stores the higher level ACC control programs executed by the processor 730 as well as spectrum policy information also used by the processor 730. The ACC module 700 supplies over an interface 750 control signals to a host radio communication device 800 comprising a host processor 810, a host baseband modem 820 and a host radio transceiver 830. An example of an interface 750 is serial data interface, such as a universal serial bus (USB). The ACC module 700 and the host device 800 would have the necessary hardware and/or software needed to implement the interface 750. The control signals the ACC module supplies to the host device 800 direct the host processor 810 as to how to control use of the spectrum (frequency assignment, power level, bandwidth control, etc.). The components of the host device 800 are dedicated to the communication protocol(s) and applications it supports, while the ACC module 700 may be designed to provide the ACC protocol communication and control functions. The deployment format shown in FIG. 13 is suitable when the host device cannot or does not have the flexibility to support any of the ACC control functions, and the radio transceiver 830 of the host device is not capable of upconverting and downconverting the ACC protocol signals.

FIG. 14 shows an example of a deployment format wherein the host device 800 has a host radio transceiver 830 that is capable of upconverting and downconverting the ACC protocol signals, but not the baseband and higher level processing. The ACC module 700' is similar to ACC module 700 except that it does not include a dedicated radio transceiver. The ACC modem 720 is coupled to an interface circuit 755 that interfaces signals between the ACC modem 720 and the host radio transceiver 830.

For example, the interface circuit 755 is a multiplexer that couples analog or digital baseband ACC signals to be transmitted to the host radio transceiver 830 and couples the received baseband ACC signals to the ACC modem 720 from the host radio transceiver 830. The host processor 810 also will receive via an interface 750 (similar to the one described above in conjunction with FIG. 13) the control signals generated by the processor 730 that determine how the host radio communication device 800 uses the radio frequency band.

There are many useful applications of the ACC protocol technology. One example is a set-top device. For example, a set-top box (capable of acting as a participant device) would announce itself and its capabilities including communication protocol type (e.g., IEEE 802.11a, Bluetooth™, IEEE 802.15.4), wireless service it supports (e.g., WAN data, VoIP over 802.11a, video over 802.11a, remote control via Bluetooth™ or 802.15.4), and receiving similar information from other participant devices (e.g., receive information from remote controls, video juke boxes, stereo, cordless VoIP phones, etc.).

The set-top box would determine where neighboring homes are deploying their WLAN/WPAN channels and locate itself in the best location in the spectrum for a new channel(s). This may require other participant devices to change frequencies in order to optimize spectral efficiency and capacity/interference. The set-top box may also learn, from information shared by other participant devices, where there is interference (due to microwaves, radars, or non-ACC devices) in the band and make a note to stay away from them. The set-top box device can then begin deployment of the desired protocol(s) and create connections with other devices (e.g., VoIP phones, laptops, televisions, etc.).

Other examples of applications of the ACC protocol technology are televisions that announce their capability and determine what other devices are active in a home, and make a wireless connection with video juke boxes, set-top boxes, remote controls, etc. The ACC protocol technology may have utility in stereo equipment, vending machines, cordless telephones, cellular telephones, still and video cameras, remote controls, lights/appliances, and personal digital assistants. For example, a cellular telephone may locate where Bluetooth™ or voice-over IP (VoIP) IEEE 802.11x is supported for a user ID in order to obtain a cellular-to-WLAN handoff. A PDA may determine that a user's favorite news service is supported, on a wireless channel supported by a certain communication protocol, and immediately join the network to receive information on that service. Still another example is a frequency band where multiple cellular telephone devices may obtain VoIP IEEE 802.11x service in the presence of other IEEE 802.11x devices as well as non-IEEE 802.11x frequency hopping cordless phone devices.

The ACC protocol concepts can be made a part of communication protocols for devices that operate in a shared radio frequency band. For example, the IEEE 802.11x protocols may include the ACC protocol and another communication protocol, such as Bluetooth™, IEEE 802.15.4 or any future protocol or standard may include the ACC protocol. In this way, devices that operate in accordance with these different standards will automatically include the intelligence to cooperate with devices of other communication standards in using the shared frequency band or bands.

In sum, a method is provided for sharing use of a radio frequency band by a plurality of devices that may operate with different communication protocols, the method comprising sharing information among the devices using a common signaling format so that the devices may self-regulate their use of the radio frequency band. Each device may control one or more of its operational parameters based on knowledge about how the other devices are using the frequency band.

From the perspective of a device operating in the frequency band, a method is provided for operating a radio communication device that operates in a radio frequency band shared with a plurality of other radio communication devices. The method comprises generating a signal for transmission from the first radio communication device to be received by the plurality of other radio communication devices, wherein the signal contains information describing how the first radio communication device uses the radio frequency band.

Still further, a combination is provided comprising a modem that generates a baseband signal for radio transmission and recovers a baseband signal from a received radio signal, and a control processor coupled to the modem that supplies data for transmission to the modem and processes data recovered from a received radio signal by the modem. The control processor generates spectrum usage data coupled to the modem to be formatted for transmission to other radio communication devices operating in a radio frequency band, wherein the spectrum usage data comprises information describing how a radio communication device associated with the modem and control processor uses the radio frequency band. Furthermore, the control processor processes received spectrum usage data derived from a received baseband signal that describes how at least one other radio communication device uses the radio frequency band, and wherein the control processor generates control signals to control one or more operational parameters of the radio communication device that impact usage of the radio frequency band based on the received spectrum usage data. This combination may be coupled to a host radio communication device in order to supplement its functionality to comply with the ACC protocol.

Yet further, a processor readable medium is provided which is encoded with instructions that, when executed by a processor, cause the processor to perform a step of generating a signal for transmission from a first radio communication device to be received by a plurality of other radio communication devices, wherein the signal contains information describing how the first radio communication device uses a radio frequency band in which it operates.

The above description is intended by way of example only.

What is claimed is:

1. A method for sharing use of a radio frequency band by a plurality of devices that may operate with different communication protocols, the method comprising sharing information among the devices using a common signaling format so that the devices may self-regulate their use of the radio frequency band, wherein the step of sharing comprises steps of:

a. transmitting from each device a spectrum usage signal using the common signaling format that is different from a communication protocol that the device uses for transmitting and receiving communication traffic but which common signaling format is recognizable by the plurality of devices, wherein the spectrum usage signal includes information that identifies frequency(ies) of operation and the communication protocol used by that device for its communication traffic; and b. receiving at each of the plurality of devices the spectrum usage signal transmitted by each of the other devices and recovering the information included therein.

2. The method of claim 1, and further comprising a step of controlling in each device, based on the information contained in the spectrum usage signal, one or more operational parameters of the device.

3. The method of claim 2, and further comprising the step of storing in each device spectrum policy information that describes rules concerning usage of the radio frequency band.

4. The method of claim 3, wherein the step of controlling in each device is based on the information included in spectrum usage signals received from other devices and the spectrum policy information.

5. The method of claim 3, wherein the step of storing spectrum policy information comprises storing prioritization rules concerning priority of use of the frequency band based on at least one characteristic including data traffic type and communication protocol type.

6. The method of claim 3, wherein the step of controlling comprises operating a device with parameters based on spectrum policy information that dictates avoiding interference with other devices operating in the radio frequency band.

7. The method of claim 6, wherein the step of controlling comprises operating a device with parameters based on spectrum policy information that dictates interfering with another device that will have the least detrimental impact of all other devices in the event that interference with at least one device cannot be avoided.

8. The method of claim 1, wherein the step of transmitting comprises transmitting the spectrum usage signal from each device on a periodic or occasional basis.

9. The method of claim 1, wherein the step of transmitting the spectrum usage signal further comprises transmitting information indicating the type of traffic that the device transmits and power level.

10. The method of claim 1, and further comprising the step of at a particular device transmitting information requesting one or more other devices to change an operational parameter including an operation frequency or transmit power level when the particular device is not able to avoid interfering with the one or more other devices.

11. The method of claim 10, and further comprising the step of alerting a user of the particular device in the event that it cannot avoid interfering with another device and that the other device cannot change its operational parameters to avoid interfering with the particular device.

12. The method of claim 11, and further comprising the step of allocating usage of the radio frequency band between the particular device and the other device or devices based on usage prioritization rules in the event that the particular device cannot avoid interfering with the other device and that the other device cannot change its operational parameters to avoid interfering with the particular device.

13. The method of claim 1, wherein the step of transmitting comprises transmitting from a particular device information requesting one or more other devices to transmit a signal that the particular device measures.

14. The method of claim 13, and further comprising the step of measuring a power level of the signal received at the particular device to determine whether the one or more other devices should be considered an interferer with the particular device.

15. The method of claim 14, and further comprising the step at the particular device of deciding whether to honor spectrum usage information associated with the one or more other devices depending on whether the signal received therefrom interferes with the particular device.

16. The method of claim 1, and further comprising the step of, in response to receiving a request signal from a device seeking information about and/or access to the radio frequency band, transmitting a response signal from any one of the plurality of devices to the requesting device, wherein the response signal includes information about activity and usage in the radio frequency band by each of the plurality devices.

17. The method of claim 16, and further comprising the step of including in the response signal, information selected from the group consisting of: number of devices that transmit and respond to the information in the radio frequency band, number and type of each communication protocol used by the devices, priorities for certain types of data in the radio frequency band, frequencies known to have interference, security information, services supported and on which communication protocol those services are supported.

18. The method of claim 16, and further comprising the step of including in the response signal information describing operating parameters to use in the radio frequency band, including frequency and/or power level.

19. The method of claim 1, wherein the step of transmitting comprises transmitting the spectrum usage signal in the radio frequency band at a carrier frequency.

20. The method of claim 19, wherein the step of transmitting comprises transmitting the spectrum usage signal using a spreading code.

21. A method for operating a first radio communication device in a radio frequency band shared with a plurality of other radio communication devices, the method comprising steps of:
   a. generating a spectrum usage signal for transmission from the first radio communication device to be received by the plurality of other radio communication devices using a common signaling format that is different from a communication protocol that the first radio communication device uses for transmitting and receiving communication traffic but which common signaling format is recognizable by the plurality of other radio communication devices, wherein the spectrum usage signal contains information identifying frequency(ies) of operation and the communication protocol used by the first radio communication device for communication traffic; and
   b. generating control signals for one or more operational parameters of the first radio communication device based on a spectrum usage signal sent by at least one other radio communication device according to the common signaling format that is different from a communication protocol that the at least one other radio communication device uses for transmitting and receiving communication traffic, wherein the spectrum usage signal is received from the at least one other radio communication device and contains information identifying frequency(ies) of operation and communication protocol type used by the at least one other communication device for its communication traffic.

22. The method of claim 21, and further comprising generating control signals for one or more operational parameters of the first radio communication device based on a spectrum usage signal received from at least one other radio communication device that contains information describing its usage of the radio frequency band.

23. The method of claim 22, and further comprising a step of storing in the first radio communication device spectrum policy information that describes rules concerning usage of the radio frequency band.

24. The method of claim 23, wherein the step of generating control signals is based on information included in spectrum usage signals received from the plurality of other radio communication devices and the spectrum policy information.

25. The method of claim 23, wherein the step of storing spectrum policy information comprises storing prioritization rules concerning priority of use of the frequency band based on at least one device characteristic.

26. The method of claim 23, wherein the step of generating control signals comprises generating signals to control the first radio communication device based on spectrum policy information that dictates avoiding interference with other radio communication devices operating in the radio frequency band.

27. The method of claim 26, wherein the step of generating control signals comprises generating signals to control the first radio communication device with parameters based on spectrum policy information that dictates interfering with another radio communication device that will have the least detrimental impact of all other radio communication devices in the event that interference with at least one radio communication device cannot be avoided.

28. The method of claim 21, and further comprising a step of transmitting the spectrum usage signal center at a carrier frequency in the radio frequency band.

29. The method of claim 21, and further comprising a step of transmitting the spectrum usage signal with a spreading code in a portion of the radio frequency band.

30. The method of claim 21, wherein the step of generating the spectrum usage signal further comprises including in the spectrum usage signal information pertaining to the traffic type communicated by the first radio communication device and the power level used by the first communication device.

31. The method of claim 21, and further comprising the step of generating information requesting one or more other devices to change an operational parameter including an operation frequency or transmit power level.

32. The method of claim 31, and further comprising the step of alerting a user of the first radio communication device in the event that the first communication device cannot avoid interfering with another device and that the other device cannot change its operational parameters to avoid interfering with the first communication device.

33. The method of claim 32, and further comprising the step of allocating usage of the radio frequency band between the first radio communication device and the other device based on usage prioritization rules in the event that the first radio communication device cannot avoid interfering with the other device and that the other device cannot change its operational parameters to avoid interfering with the first radio communication device.

34. The method of claim 21, and further comprising a step of, in response to receiving a request signal from another device seeking information about and/or access to the radio frequency band, generating a response signal to be transmitted to the other device, wherein the response signal includes information about activity and usage in the radio frequency band.

35. The method of claim 34, and further comprising a step of including in the response signal information selected from the group consisting of: number of radio communication devices that transmit and respond to the signal in the radio frequency band, number and type of each communication protocol used by radio communication devices, priorities for certain types of data in the radio frequency band, frequencies known to have interference, security information, services supported and on which communication protocol those services are supported.

36. The method of claim 35, and further comprising the step of including in the response signal information describing operating parameters to use in the radio frequency band, including operating frequency and/or power level.

37. In combination, a modem that generates a baseband signal for radio transmission and recovers a baseband signal from a received radio signal, and a control processor coupled to the modem that supplies data for transmission to the modem and processes data recovered from a received radio signal by the modem, wherein the control processor generates spectrum usage data coupled to the modem to be formatted for transmission to other radio communication devices operating in a radio frequency band using a common signaling format that is different from a communication protocol used for transmitting and receiving communication traffic but which common signaling format is recognizable by other radio communication devices, wherein the spectrum usage data comprises information identifying frequency(ies) of operation and the communication protocol used for communication traffic, and wherein the control processor processes received spectrum usage data derived from a received baseband signal that identifies frequency (ies) of operation and the communication protocol used for communication traffic of the at least one other radio communication device, and wherein the control processor generates control signals to control one or more operational parameters of the radio communication device that impact usage of the radio frequency band based on the received spectrum usage data.

38. A radio communication device comprising the combination of claim 37, and further comprising a radio transceiver coupled to the modem that upconverts the baseband signal for transmission and downconverts a received signal to baseband.

39. The radio communication device of claim 38, wherein the modem modulates a baseband signal that contains the spectrum usage data for transmission according to the common signaling format recognized by other radio communication devices in the radio frequency band and demodulates a baseband signal that contains received spectrum usage data from at least one other radio communication device operating in the radio frequency band, and wherein the modem formats data according to a first communication protocol to be transmitted to at least one other radio communication device that operates according to the first communication protocol and demodulates a received baseband signal from another radio communication device according to the first communication protocol.

40. The combination of claim 37, and further comprising a radio transceiver coupled to the modem that upconverts the baseband signal containing the spectrum usage data for transmission and downconverts a received signal to baseband containing spectrum usage data from another radio communication device in the radio frequency band.

41. The combination of claim 37, and further comprising a memory that stores spectrum policy information that includes one or more rules for how a radio communication device uses the radio frequency band, and wherein the control processor generates the control signals based on the received spectrum usage data and the spectrum policy information stored in the memory.

42. The combination of claim 37, and further comprising an interface that couples signals between a host processor of the radio communication device and the control processor so that the host processor receives control signals generated by the control processor to control how the radio communication device uses the radio frequency band based on received spectrum usage data.

43. The combination of claim 37, and further comprising an interface circuit that couples signals between the modem and a radio transceiver in the radio communication device to enable the radio transceiver to transmit and receive signals containing spectrum usage data, an interface that couples signals between the control processor and a host processor in the radio communication device so that the host processor receives control signals generated by the control processor to control how the radio communication device uses the radio frequency band based on received spectrum usage data.

44. A processor readable medium encoded with instructions that, when executed by a processor, cause the processor to perform a steps of:

a. generating a spectrum usage signal for transmission from a first radio communication device to be received by a plurality of other radio communication devices using a common signaling format that is different from a communication protocol that the first radio communication device uses for transmitting and receiving communication traffic but which common signaling format is recognizable by the plurality of other radio communication devices, wherein the spectrum usage contains information identifying frequency(ies) of operation and communication protocol used by the first radio communication device for communication traffic; and b. generating control signals for one or more operational parameters of the first radio communication device based on a spectrum usage signal sent by at least one other radio communication device according to the common signaling format that is different from a communication protocol that the at least one other radio communication device uses for transmitting and receiving communication traffic, wherein the spectrum usage signal is received from the at least one other radio communication device and contains information identifying frequency(ies) of operation and communication protocol type used by that device for communication traffic.

45. The processor readable medium of claim 44, and further comprising instructions encoded on the medium that cause the processor to perform the step of generating control signals based on the spectrum usage signal received from at least one other radio communication device and on spectrum policy information that includes one or more rules governing use of the radio frequency band.

* * * * *